Sept. 2, 1969     W. L. McKOWN ET AL     3,464,826
PROCESS FOR MAKING BREAKFAST CEREAL
Filed April 20, 1965
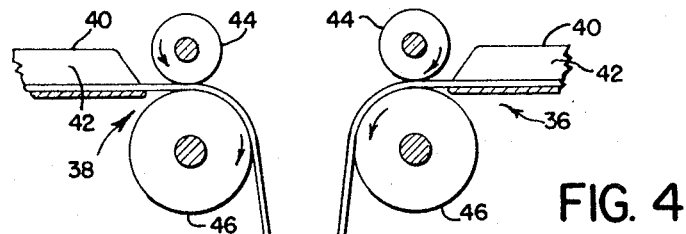
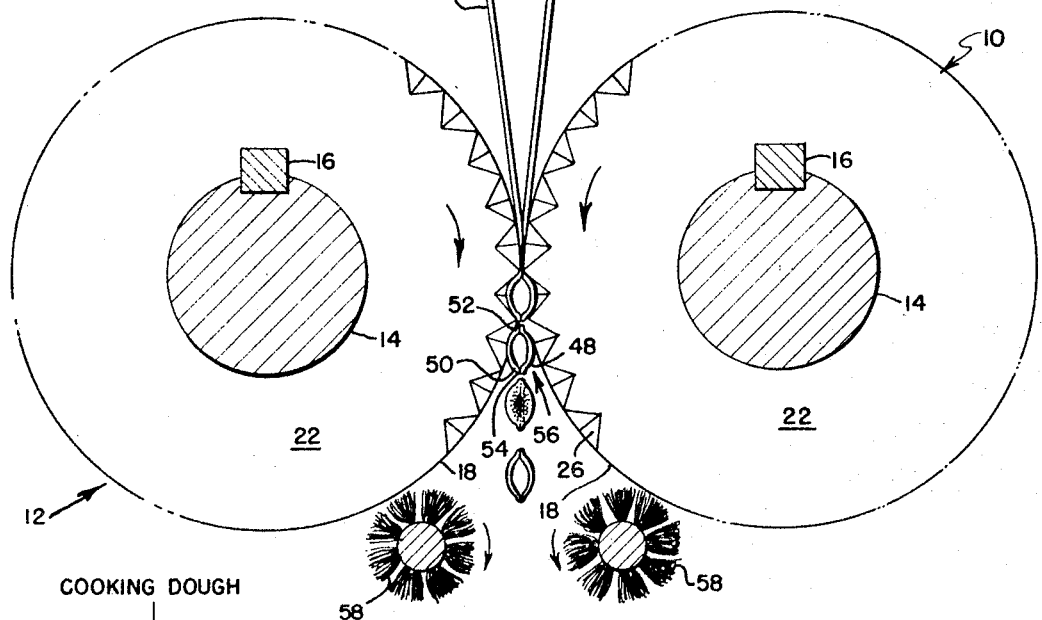
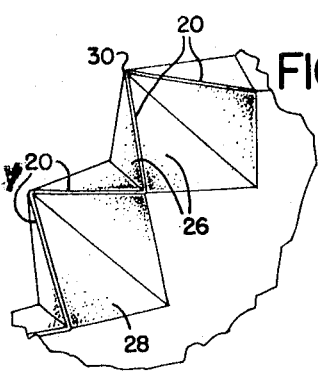
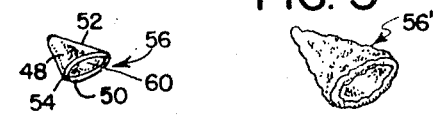
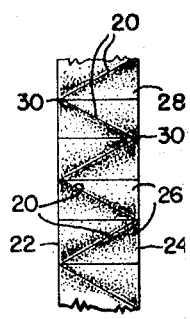
INVENTORS
WILLIAM L. McKOWN
PHILIP K. ZIETLOW
MURRAY E. BALL
BY
ATTORNEY United States Patent Office 3,464,826
Patented Sept. 2, 1969

3,464,826
PROCESS FOR MAKING BREAKFAST CEREAL
William L. McKown, Minneapolis, Philip K. Zietlow, Northfield, and Murray E. Ball, Rockford, Minn., assignors to General Mills, Inc., a corporation of Delaware
Filed Apr. 20, 1965, Ser. No. 449,514
Int. Cl. A23l 1/18
U.S. Cl. 99—81        3 Claims

ABSTRACT OF THE DISCLOSURE

A process for making a hollow, cone-shaped breakfast cereal. Two ribbons of cooked dough having a prescribed width and thickness, are joined together and formed into cone-shaped pieces. The pieces when dried and subjected to intense heat, expand to form an edible food product.

---

The present invention relates to a process for making a puff-type ready-to-eat breakfast cereal.

A conventional method of making such breakfast cereals is to cook a cereal product (e.g., wheat, oats, corn, etc.) with water and usually some other ingredients to make a gelatinized dough that is formed into pieces or pellets of a desired shape. These pieces are then subjected to an intense heating and/or an abrupt pressure change which puffs or toasts and puffs the same, to impart to the end product a desired flavor and give it a light, puffy texture.

In recent years there has been an increasing emphasis toward making breakfast cereals which have some different or distinctive feature to give it a special appeal. For example, breakfast cereals have been made in different flavors, textures and colors; fruit and other ingredients have been incorporated in some manner; and cereal with pieces of various configurations have been made. Obviously, since the dough pieces are formed from a moist sticky dough, and with the dough pieces being small enough so that the finished pieces are spoon size or smaller, there are certain practical limitations as to the shape into which the cereal product can be made, and in the manner in which they can be handled or otherwise processed. This is especially so if the breakfast cereal is to be made on a full commercial scale.

In view of this, it is a principal object of the present invention to provide a new process for making a breakfast cereal product, which process is quite practical for a commercial operation, and in which the individual finished cereal pieces are a convenient cereal biscuit size and yet have a distinctive conical shape, this process being such that the product has the texture, flavor and other characteristics of a high quality breakfast cereal.

These and other objects and features of the invention will be more readily understood and appreciated from the following detailed description of the preferred embodiments thereof selected for purposes of illustration and shown in the accompanying drawings, in which:

FIG. 1 is a schematic drawing of the process the present invention;

FIG. 2 is a perspective view of a cereal piece before the final puffing;

FIG. 3 is a perspective view of a cereal piece after puffing;

FIG. 4 is a semi-schematic view taken generally in side elevation of the cutting and forming apparatus utilized in the present invention;

FIG. 5 is a perspective view of a portion of the periphery of one of the cutting and forming wheels of FIG. 4, and FIG. 6 is a layout view of a portion of the periphery of one of the cutting and forming wheels of the apparatus of FIG. 4.

In a pending United States patent application, entitled "Dough Forming Machine," Ser. No. 345,035, now issued as Patent No. 3,310,001, which patent is assigned to the assignee of the present invention, there is disclosed an apparatus and process for forming dough into cone-shaped pieces. Although the specific embodiment disclosed in the specification of that patent application is directed particularly toward making snack pieces of a size somewhat larger than the desired size of the breakfast cereal pieces of the present invention, certain teachings of that patent application have been utilized in the present invention.

In the present invention, a cereal product, water, and desirably some other ingredients are cooked to form a dough which is formed into two ribbons of a predetermined width and thickness (these dimensions being disclosed more particularly hereinafter). These ribbons are directed under moderate tension into a location between two counter-rotating, generally tangent cutting and forming wheels, each of which has the circumference thereof formed with blunt cutting edges arranged in a generally "zigzag" pattern and matching with the cutting edges on the other wheel. The two wheels cut the two dough ribbons and seal the same one to another along such lines of cutting so that tapered dough pellets are formed. The action of the cutting and forming wheels is such that the portions from each ribbon that form each pellet curve away from one another. These pellets are dried to a desired moisture level and then puffed to become finished cereal pieces, each having a distinctive cone shape.

The present invention will now be described with more particularity.

The ingredients for the dough which is made into the end product are primarily a cereal product and water. Corn, wheat, rice, oats, barley, rye, and other cereals and combinations thereof are suitable for use in the present invention, and generally the dehulled cereal product is used (e.g., corn grits). Of course, other ingredients can be, and preferably are, incorporated in addition to the cereal product and water, to give a particular character to the flavor and other qualities of the end product. For example, salt, sugar, starch, malt, and oil could quite advantageously be added.

The ingredients are mixed and cooked to form a gelatinized dough. One suitable method is to use one of the continuous cookers known in the art which cook the ingredients in a steam jacketed cooker. Another method is to cook the ingredients mechanically (i.e., work the ingredients mechanically so as to impart heat to the same).

Often, in these cooking processes, water is added to the ingredients during the course of the cooking. The amount of water used as an original ingredient and the amount of water added during the course of the cooking should be such that the moisture content of the cooked dough at the completion of the cooking be between about 20% to 35%, based upon total weight, and most desirably between about 22 to 28%. At this moisture content, the dough is in the best condition for further processing. After being cooked, the dough is formed into two substantially flat ribbons. One suitable method of this is to extrude the dough into a ribbon form, and another is to pass the dough through counter-rotating rollers.

The two ribbons of dough are then formed into pellets of a predetermined shape by means of a cutting and forming operation to be described with some particularity hereinafter. The width of the ribbon of dough should be between at least about ¼ to ¾ of an inch, and desirably between about ⅜ to ⅝ of an inch in width. The thickness of each ribbon should be at least between about 0.020 to 0.050 inches, and most desirably between about 0.030 to 0.040 inches. The significance of these limitations will become more clear during the course of the following description.

The apparatus by which this forming and cutting operation is accomplished is disclosed semi-schematically in FIGS. 4–6. As illustrated in FIG. 4, there are identical right and left cutting wheels 10 and 12, respectively, positioned side by side and tangent to one another. Each is mounted concentrically on a respective longitudinally aligned shaft 14 and is keyed to the same as at 16. The circumferential face 18 of each wheel 10 and 12 is formed with a plurality of blunt cutting edges 20 which extend diagonally across the face 18 in a zigzag pattern along the entire periphery of each of the wheels 10 and 12. Thus it can be seen that each proximate pair of cutting edges 20 define a V, with every other V opening to the front face 22 of its related wheel 10 or 12, and the remaining alternate V's opening toward the rear face 24 of the wheel 10 or 12. Each of the wheels 10 or 12 is recessed or cut away along two angled planes at the location of each V defined by each pair of cutting edges 20 to form a plurality of recesses 26, each recess 26 tapering from the open end 28 of the V toward the apex 30 of the V, so as to be shaped as one-half of a pyramid which is split along its center axis. As will be apparent hereinafter, the tapered shape of the recesses 26 can vary to some extent (e.g., be shaped as half a cone split along its center axis), but for ease in manufacture they are desirably formed as shown herein.

The right and left wheels 10 and 12 are each carried and counter-rotated by means of its respective shaft 14, and are arranged in such a manner that the cutting edges 20 thereof coincide as they come into contact at the tangent point of the two wheels 10 and 12. As a pair of proximate cutting edges 20 on one wheel 10 comes adjacent to a matching pair of cutting edges 20 on the other wheel 12, the two recesses 26 between such matching pairs of cutting edges 20 collectively form a cavity 26—26 of a general pyramid-like configuration. As the wheels 10 and 12 continue to rotate a short distance further so that the next proximate cutting edge 20 from the wheel 10 comes adjacent to its matching cutting edge 20 from the wheel 12, the next pair of recesses 26 which come adjacent to one another likewise collectively form a pyramid-like cavity 26—26, which, however, opens in a direction opposite to that of the preceding cavity 26—26.

The two elongate ribbons of dough described hereinbefore (shown at 32 and 34) are fed in generally parallel face to face relationship between the wheels 10 and 12 by suitable means, such as two feed roller assemblies 36 and 38. As shown herein, each of these assemblies 36 and 38 comprises a horizontal transversely aligned channel piece 40 which defines a guide trough 42 for a related one of the dough ribbons 32 and 34. At the outfeed end of each channel piece 40, there is a respective pair of rollers 44 and 46 which serve to feed and guide its related dough ribbon 32 or 34 at a predetermined speed toward the forming and cutting wheels 10 and 12. Suitable drive means (not shown) is provided for the one roller 46 of each unit 36 or 38.

In operation, the two cutting and forming wheels 10 and 12 are rotated, respectively, counter-clockwise and clockwise (as seen in FIG. 4). The two ribbons of dough 32 and 34 are fed downwardly from their respective feed assemblies 36 and 38 between the wheels 10 and 12, with the ribbons 32 and 34 thus traveling into the area of tangency of the wheels 10 and 12 (this area of tangency being the cutting and forming area of the wheels 10 and 12). The liner speed of the dough ribbons 32 and 34 traveling into the cutting and forming area is moderately less than the peripheral speed of the cutting wheels 10 and 12, so that the dough ribbons 32 and 34 are stretched to some degree as they move into the cutting and forming area.

As the two dough ribbons 32 and 34 move into this forming and cutting area, each matching pair of blunt cutting edges 20 (one from each wheel 10 and 12) come together as they move into the cutting and forming area to cut through both ribbons of dough 32 and 34. The effect is that each proximate two pairs of cutting edges 20 cut out two triangular portions 48 and 50 from each dough ribbon 32 and 34. Since the cutting edges 20 are made somewhat blunt, the dough ribbons 32 and 34 are sealed or bonded one to another along such lines of cutting. Thus, each pair of triangular dough portions 48 and 50 are bonded one to another along the two lines of cutting 52 and 54 thereof to form a tapered piece 56, such as is shown in FIG. 2.

It is important to note that each tapered piece 56, each made up of two triangular portions 48 and 50, becomes formed in such a way that the two triangular portions 48 and 50 curve outwardly from one another (as illustrated in FIG. 2), so that each piece 56 has the general appearance of a flattened cone. These pieces 56 have some tendency to stick into one or the other of the matching recesses 26 into which it is formed. Thus suitable removal means, such as the brushes 58, are provided for each of the wheels 10 and 12 to remove any of the pieces 56 which may have become lodged in one or the other of the wheels 10 and 12.

The pieces 56 are collected and dried in a suitable manner to a moisture content of between about 7 to 16%, and desirably between about 10 to 12%. This can be done by passing hot air (e.g., about 150° F.) through the pieces 56.

These pieces are then subjected to an intense heating so as to toast and puff the same. This intense heating serves to develop certain flavor characteristics in the product, and approximately doubles the overall size of each piece as well as causing an internal puffing of the same. However, there is also the effect of causing the two wall portions 48 and 50 of each piece 56 to expand further away from one another so as to bring the pieces 56 more toward a cone shaped configuration, as shown in FIG. 3 where a finished piece 56' is shown. These finished pieces 56' can then be collected and packaged for consumer use.

Various means are known by which this puffing and toasting can be accomplished. For example, an air oven can be used, or a radiant oven, or a salt puffing device. If an air oven is used, the pieces are generally heated for a period between about 5 to 20 seconds, by passing air at a temperature of about 300° to 500° F. through the pieces. If a radiant oven is used, sufficient heat is imparted to the pieces 56 to subject them to about the same rate of heat transfer as in the case of the air oven. As is known in the art, salt puffing can also be utilized, this comprising placing the pieces in a fluidized bed of salt particles at a temperature of perhaps between about 300° to 500° F. for a period of between about 5 to 20 seconds. The precise conditions for this puffing and toasting will depend, of course, upon the precise quality desired for the end portion.

The dimensions of the cutting edges 20 of the wheels 10 and 12 will depend of course upon the width of the ribbons 32 and 34 being cut. Thus, with the width of these two ribbons 32 and 34 being one-half inch, the width of the peripheral face 18 of each wheel 10 and 12 will also be about one-half inch, the length of each cutting edge 20 will be about ⅝ inch, and the distance between two apex points on one side of the wheel 10 or 12 will also be about ⅝ inch. The width of each cutting edge 20 is desirably about ¹⁄₃₂ inch, this being approximately the proper width to achieve a cutting function and yet bond the triangular portions 48 and 50 one to another along the lines of cutting without causing any undue distortion of the resulting pieces 56.

It has been found that if the width of the dough ribbons 32 and 34 is made too large, the dough pieces 56 prior to cooking do not assume a somewhat conical shape, but are shaped merely as two flattened triangular pieces joined one to another. The effect is that during the subsequent puffing and toasting, the inner surface 60 of each piece 56 has a tendency not to be exposed sufficiently to the heating medium to get the desired puffing and toasting throughout each piece 56. Also, the final configuration of each piece 56 does not have that distinctive cone-shaped character, but tends to be more flat. On the other hand, with the width of the ribbons 32 and 34 being too small, during the subsequent puffing and toasting the dough tends to fill the cavity of the cone to an undesired extent so that the final configuration is more of a solid cone instead of a shell-like conical piece. As indicated previously, a dough ribbon width of about ⅜ to ⅝ inch has been found to produce best results. Also as indicated previously, the thickness of the dough ribbon should be between about 0.020 to 0.050 inch, and most desirably is between about 0.030 to 0.040 inch. With the ribbons too thin the resulting pieces 56' are too fragile, while with the ribbons too thick, the pieces 56' are not puffed properly and the cone-like shell configuration of the pieces is not properly formed.

It should be understood that the foregoing is merely illustrative of a certain embodiment of the invention and many variations may be made by those skilled in the art without departing from the spirit and scope of the invention.

Now therefore I claim:
1. A process for making a ready-to-eat cone-shaped cereal product, said process consisting of:
   (a) making a cooked dough,
   (b) forming said dough into two ribbons, each of which has a width between about ¼ to ¾ of an inch and a thickness between about 0.020 to 0.050 inch,
   (c) bringing said dough ribbons together in a generally face to face relationship,
   (d) cutting across said dough ribbons with blunt cutting edges in a generally zigzag pattern to cut matching generally triangular portions from each ribbon, with each pair of matching triangular portions being joined one to another along such lines of cutting and curving outwardly from one another to form pieces of a generally cone-like configuration,
   (e) drying said pieces to a moisture content of about 7–16%, and
   (f) puffing said pieces, said pieces when puffed retaining a generally shell-like, cone-shaped configuration.

2. The process as recited in claim 1, wherein the width of each ribbon is between about ⅜ to ⅝ of an inch, and the thickness of each ribbon is at least about .030 inch.

3. The process as recited in claim 1, wherein said dough ribbons are cut by
   (a) feeding said ribbons between two generally tangent wheels, each of which has its periphery formed with cutting edges diagonally disposed to each other in a generally zigzag pattern and matching with cutting edges of the other wheel, and also formed with tapered recesses located between proximate cutting edges and matching with recesses of the other wheel, and
   (b) counter rotating said wheels at the same peripheral speed so that matching pairs of cutting edges come into engagement with one another to cut said ribbons.

References Cited
UNITED STATES PATENTS

| | | | |
|---|---|---|---|
| 2,998,317 | 8/1961 | Reesman | 99—80 |
| 3,190,755 | 6/1965 | Peden | 99—81 |
| 3,310,006 | 3/1967 | Hasten et al. | 107—1 |

RAYMOND N. JONES, Primary Examiner

U.S. Cl. X.R.

99—82